(12) United States Patent
Le Bouquin et al.

(10) Patent No.: US 9,039,277 B2
(45) Date of Patent: May 26, 2015

(54) TEMPERATURE SENSOR, MANUFACTURING PROCESS AND CORRESPONDING METHOD OF ASSEMBLY

(75) Inventors: Dominique Le Bouquin, Herouville Saint Clair (FR); Jean-Pierre Robic, Caen (FR)

(73) Assignee: SC2N, Creteil (FR)

( * ) Notice: Subject to any disclaimer, the term of this patent is extended or adjusted under 35 U.S.C. 154(b) by 418 days.

(21) Appl. No.: 13/126,006

(22) PCT Filed: Oct. 23, 2009

(86) PCT No.: PCT/FR2009/001240
§ 371 (c)(1),
(2), (4) Date: Jun. 7, 2011

(87) PCT Pub. No.: WO2010/049605
PCT Pub. Date: May 6, 2010

(65) Prior Publication Data
US 2011/0286494 A1    Nov. 24, 2011

(30) Foreign Application Priority Data
Oct. 27, 2008  (FR) ..................................... 08 05958

(51) Int. Cl.
*G01K 7/00* (2006.01)
*G01K 1/08* (2006.01)
*G01K 1/16* (2006.01)

(52) U.S. Cl.
CPC ............. *G01K 1/16* (2013.01); *Y10T 29/49826* (2015.01); *G01K 2205/04* (2013.01)

(58) Field of Classification Search
USPC ......... 374/100, 139, 208, 163, 120, 121, 179, 374/185, 141, 144; 703/130; 116/216; 136/200; 73/866.5; 702/130
See application file for complete search history.

(56) References Cited

U.S. PATENT DOCUMENTS

| 3,307,403 | A | * | 3/1967 | Bernett | ........................... 60/527 |
| 3,362,834 | A | * | 1/1968 | Kaye | ............................. 116/219 |
| 4,381,667 | A | * | 5/1983 | Gordon | ........................ 374/136 |

(Continued)

FOREIGN PATENT DOCUMENTS

| DE | 14 73 254 A1 | 12/1968 |
| FR | 2 847 979 A1 | 11/2002 |

(Continued)

OTHER PUBLICATIONS

International Search Report w/translation from PCT/FR2009/001240 dated Feb. 23, 2010 (4 pages).

*Primary Examiner* — Gail Kaplan Verbitsky
(74) *Attorney, Agent, or Firm* — Osha Liang LLP

(57) ABSTRACT

The invention relates to a temperature sensor comprising: a temperature-sensitive element (3); and a peripheral casing (7) accommodating the temperature-sensitive element (3) and having a closed end (9), the peripheral casing (7) being able to be inserted into a corresponding cavity (11), characterized in that the closed end (9) of the peripheral casing (7) has a peripheral portion (21) revealing, butted against the closed end, a flexible assembly stop (23) after said peripheral portion (21), said stop (23) being able to deform towards the peripheral portion (21) by shape cooperation with the bottom (15) of the corresponding cavity (11). The subject of the invention is also a process for manufacturing a temperature sensor as described above and a method of assembling said sensor.

8 Claims, 2 Drawing Sheets

(56) References Cited

U.S. PATENT DOCUMENTS

Figure 1:
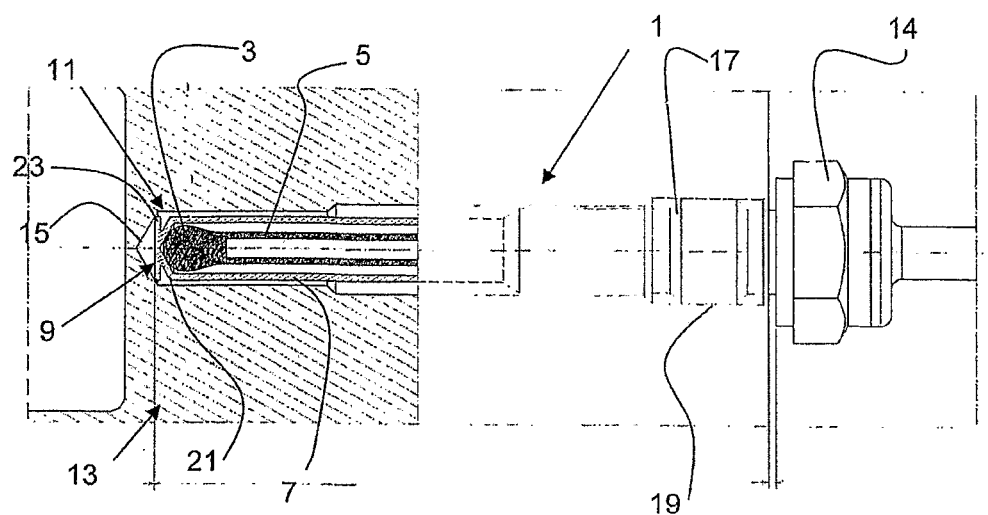

| | | | |
|---|---|---|---|
| 4,487,208 A * | 12/1984 | Kamens | 600/549 |
| 4,733,975 A * | 3/1988 | Komanetsky et al. | 374/144 |
| 5,618,109 A * | 4/1997 | Culbertson | 374/179 |
| 5,895,117 A * | 4/1999 | Wuertenberger | 374/142 |
| 7,668,686 B2 * | 2/2010 | Conte et al. | 702/130 |
| 8,263,017 B2 * | 9/2012 | Stewart et al. | 422/400 |
| 2003/0058920 A1 * | 3/2003 | Lyle | 374/185 |
| 2004/0013162 A1 * | 1/2004 | Beerwerth et al. | 374/158 |
| 2004/0258130 A1 * | 12/2004 | Gotthold et al. | 374/208 |
| 2005/0157775 A1 * | 7/2005 | Chapman | 374/170 |
| 2006/0275933 A1 * | 12/2006 | Du Bois et al. | 438/14 |

FOREIGN PATENT DOCUMENTS

| | | |
|---|---|---|
| FR | 2 864 234 A1 | 12/2003 |
| FR | 2 880 685 A1 | 1/2005 |
| GB | 2 400 660 A | 10/2004 |
| JP | 63041650 A * | 2/1988 |

* cited by examiner

TEMPERATURE SENSOR, MANUFACTURING PROCESS AND CORRESPONDING METHOD OF ASSEMBLY

The present invention concerns a temperature sensor adapted in particular to measure the temperature of automobile vehicle gases such as gases in the engine compartment.

Such sensors are known for example from the documents FR 2 847 979, FR 2 880 685 and FR 2 864 234.

These sensors comprise a temperature-sensitive element connected externally to an electrical/electronic circuit for processing a measurement signal.

The temperature-sensitive element is disposed in a peripheral envelope that is inserted in a corresponding cavity of a body (for example the cylinder head of an engine) the temperature of which is required.

In known manner, the sensor is screwed into this corresponding cavity so that the closed end of the peripheral envelope is disposed as close as possible to the area at the temperature to be measured.

There may nevertheless remain a gap between the closed end of the peripheral envelope and the bottom of the cavity because of dimensional tolerances of the peripheral envelope and the cavity. This gap is necessary for mounting the sensor in the cavity but may nevertheless contribute to significantly degrading the response time and accuracy of the sensor.

The present invention aims to solve these problems by proposing a temperature sensor, a manufacturing process and an assembly method able to overcome the problems of the prior art without increasing manufacturing time and cost.

To this end, the invention provides a temperature sensor comprising:
- a temperature-sensitive element; and
- a peripheral envelope receiving the temperature-sensitive element at a closed end, the peripheral envelope being adapted to be inserted into a corresponding cavity, characterized in that the closed end of the peripheral envelope has a peripheral portion revealing at the end of the closed end a flexible assembly stop after said peripheral portion, said stop being able to deform toward the peripheral portion by shape cooperation with the bottom of the corresponding cavity.

According to other features of the temperature sensor:
- the flexible assembly stop is disc-shaped,
- the peripheral portion has a frustoconical shape,
- the flexible assembly stop and the peripheral portion of the peripheral envelope are formed in one piece,
- the peripheral envelope is of metal,
- the temperature-sensitive element is a PTC (positive temperature coefficient) or NTC (negative temperature coefficient) type thermistor.

The invention also provides a process for the manufacture of a temperature sensor as described above, characterized in that the flexible assembly stop and the peripheral portion are produced by turning to machine a groove of triangular section in the peripheral envelope.

The invention further provides a method of assembling a temperature sensor into a corresponding cavity, the temperature sensor comprising a temperature-sensitive element and a peripheral envelope receiving the temperature-sensitive element at a closed end, the peripheral envelope being inserted in said cavity, characterized in that it includes:
- a first step of assembling said sensor into the corresponding cavity so as to position a flexible assembly stop at the closed end of the peripheral envelope facing a bottom of the corresponding cavity,
- a second step in which projecting walls of the flexible assembly stop are deformed at least partially in the direction of a peripheral portion of said end of the peripheral envelope by shape cooperation between said stop and the bottom of said cavity.

Figure 2:
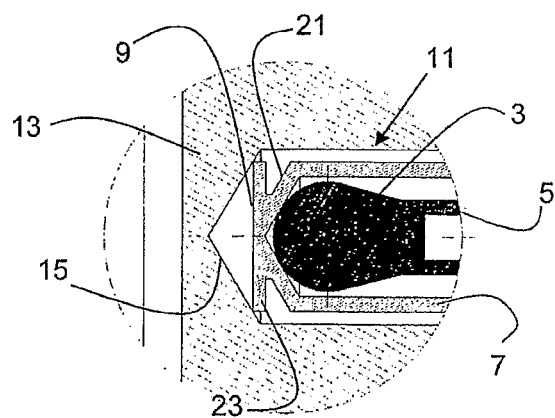
Figure 3:
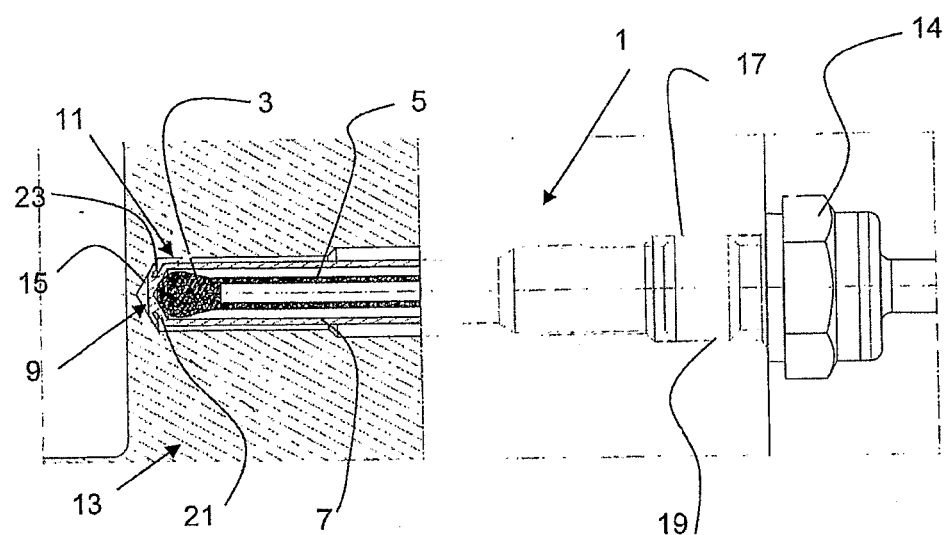
Figure 4:
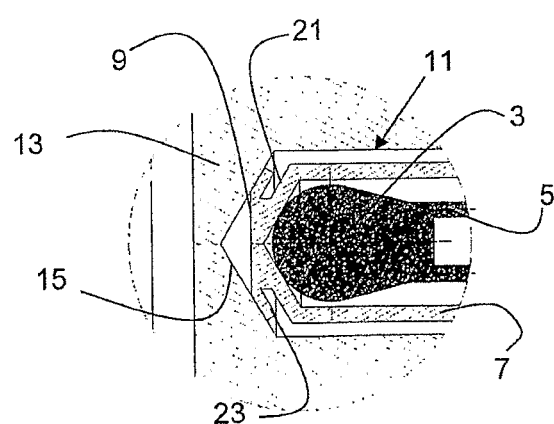

Other advantages and features will become apparent on reading the description of the invention and from the following figures, in which:

FIG. 1 represents a view partly in longitudinal section of a temperature sensor of the invention during assembly into a cavity, FIG. 2 represents a view to a larger scale of part of the FIG. 1 sensor, FIG. 3 represents the FIG. 1 sensor when assembled into the cavity, and FIG. 4 represents a view to a larger scale of part of the FIG. 3 sensor.

In all the figures, identical elements carry the same reference numbers.

The temperature sensor 1 shown in FIG. 1 comprises a temperature-sensitive element 3, a wiring element 5 connected to the temperature-sensitive element 3, and a peripheral envelope 7 enveloping the temperature-sensitive element 3 at a closed end 9.

The temperature-sensitive element 3 is for example a thermistor.

A thermistor is a passive semiconductor material component the resistance of which varies as a function of temperature and may be of the negative temperature coefficient (NTC) type if the temperature decreases as a function of increasing temperature or the positive temperature coefficient (PTC) type in the contrary situation.

The wiring element 5 is connected to the temperature-sensitive element 3 to feed a temperature signal to a processor unit.

As shown in FIG. 1, for example, the wiring element 5 includes two electrical conductors in contact with the temperature-sensitive element 3 and routed along the peripheral envelope 7 to be accessible from outside the latter and to provide electrical information representative of the resistance of the element 3 and consequently of the measured temperature.

The peripheral envelope 7 is of elongate and cylindrical general shape, the longitudinal direction of which corresponds to the direction of the electrical wires 5, so that it can be inserted into a corresponding cavity 11.

The corresponding cavity 11 is provided in a body 13 the temperature of which is to be measured, for example in the cylinder head of an automobile vehicle.

The cavity 11 is of tubular shape and the bottom 15 of the cavity 11, generally of conical shape, is disposed as close as possible to the area the temperature of which is to be measured.

Furthermore, the peripheral envelope 7 advantageously includes a part 17 with a male thread adapted to be screwed into a corresponding part 19 of the cavity 11 with a female thread to fix the sensor 1 to the body 13.

The sensor 1 further includes external fixing means 14 for taking hold of the sensor 1 to screw it into and/or unscrew it from the body 13.

In the example shown diagrammatically in the figures, the exterior fixing means 14 take the form of a bolt.

According to the invention, and as seen better in FIG. 2, the closed end 9 of the peripheral envelope 7 includes a thinner peripheral portion 21 revealing at the end of the closed end 9 a flexible assembly stop 23 after said thinner portion 21, the stop 23 being able to deform toward the thinner peripheral portion 21 through shape cooperation with the bottom 15 of the corresponding cavity 11.

Thus, after assembling the sensor 1 into the cavity 11, the stop 23 is deformed toward the thinner peripheral portion 21 by shape cooperation with the bottom 15 of the corresponding cavity 11 as may be seen in FIGS. 3 and 4.

The end 9 of the deformed peripheral envelope 7 is then in contact with the bottom 15 of the cavity 11, which improves heat exchange between the sensor and the body 13 through conduction.

A temperature measurement is obtained in this way with reduced response time and increased accuracy.

In a preferred embodiment, the flexible assembly stop is disc-shaped. The disc 23 is disposed coaxially with the peripheral envelope 7.

Accordingly, once the projecting parts of the disc 23 have been deformed, the area of contact between the stop 23 and the cavity 11 is larger, optimizing heat exchange and thus further reducing the response time of the sensor 1.

Furthermore, deformation of the stop 23 toward the thinner portion 21 optimizes thermal conduction locally in the area the temperature of which is required and to move the temperature-sensitive element 3 as close as possible to the bottom 15 of the cavity 11, which further increases the accuracy of the measurement.

Furthermore, the thinner peripheral portion 21 has a frustoconical shape the summit of which adjoins the flexible assembly stop 23. The flexible assembly stop and the thinner peripheral portion 21 of the peripheral envelope 7 are preferably formed in one piece.

Thus no component is added to the sensor 1, which produces a robust sensor 1.

In one embodiment of the sensor 1, the flexible assembly stop 23 is produced by turning to machine a groove of triangular section in the peripheral envelope 7.

The disc-shaped stop 23 is thus easy to produce and does not necessitate any further machining.

In operation, in a first step (FIGS. 1 and 2), the sensor 1 is assembled into the corresponding cavity 11 to position a flexible assembly stop 23 of the closed end 9 of the peripheral envelope 7 facing the bottom 15 of the corresponding cavity 11.

The sensor 1 may be assembled into the cavity 11 by screwing the sensor 1 into the threaded part of the corresponding cavity 11 until it abuts against the bottom 15 of the corresponding cavity 11.

The length of the peripheral envelope 7 is made substantially equal to the depth of the corresponding cavity 11 but with a gap J in the assembly of the sensor 1 into the cavity 11 so that during assembly, when the flexible assembly stop 23 is in contact with the bottom 15 of the cavity 11, the sensor 1, which at this stage is not totally screwed into the cavity 11, projects slightly from the cavity 11.

This gap J corresponds to the further distance that the sensor 1 may travel from its position with the stop 23 not deformed to the assembled state, i.e. with the flexible stop 23 deformed.

In a second step (FIGS. 3 and 4) the projecting walls of the flexible assembly stop 23 are at least partially deformed toward the thinner peripheral portion 21 of the closed end 9 of the peripheral envelope 7 by shape cooperation between the stop 23 and the bottom 15 of the cavity 11. This operation is carried out by applying a greater force to screw in the temperature sensor 1 to enable deformation of the flexible assembly stop 23.

The projecting portions of the flexible assembly stop 23 are then deformed outwards, expanding the shape of the conical bottom 15 of the cavity 11.

Assembly is completed when the exterior fixing means 14 are in contact with the body 13. It is then no longer possible to screw in the sensor 1, which ensures that the sensor 1 is not damaged and that the flexible assembly stop 23 is optimally deformed in the cavity 11.

There is obtained in this way a temperature sensor 1 that is easy to produce and to assemble, the response time of which is reduced, and the accuracy of which is increased.

The invention claimed is:

1. A temperature sensor for an engine compartment of an automotive vehicle, comprising:
   a temperature-sensitive element; and
   a peripheral envelope for receiving the temperature-sensitive element comprising a closed end, the peripheral envelope configured to be inserted into a corresponding cavity,
   wherein the closed end of the peripheral envelope comprises a peripheral portion and a flexible assembly stop, wherein the flexible assembly stop is located at a distal end of the peripheral envelope, and wherein the flexible assembly stop deforms in a direction away from the distal end of the peripheral envelope and towards the peripheral portion by shape cooperation with a bottom of the corresponding cavity.

2. The temperature sensor according to claim 1, wherein the flexible assembly stop is disc-shaped.

3. The temperature sensor according to claim 1, wherein the peripheral portion has a frustoconical shape.

4. The temperature sensor according to claim 1, wherein the flexible assembly stop and the peripheral portion of the peripheral envelope are formed in one piece.

5. The temperature sensor according to claim 1, wherein the peripheral envelope is metal.

6. The temperature sensor according to claim 1, wherein the temperature-sensitive element is a PTC (positive temperature coefficient) or NTC (negative temperature coefficient) type thermistor.

7. A method of manufacturing a temperature sensor according to claim 2, comprising: producing the flexible assembly stop and the peripheral portion by machining a triangular groove in the peripheral envelope.

8. A method of assembling a temperature sensor for an engine compartment of an automotive vehicle into a corresponding cavity, the temperature sensor comprising a temperature-sensitive element and a peripheral envelope receiving the temperature-sensitive element at a closed end, the peripheral envelope being inserted in the corresponding cavity, the method comprising:
   assembling the temperature sensor into the corresponding cavity in a first direction so as to position a flexible assembly stop of the closed end of the peripheral envelope facing a bottom of the corresponding cavity; and
   deforming projecting walls of the flexible assembly stop outwardly and at least partially in a second direction towards a peripheral portion of the closed end of the peripheral envelope by shape cooperation between the flexible assembly stop and the bottom of the corresponding cavity,
   wherein the first direction is substantially opposite to the second direction.

* * * * *